(12) United States Patent
Mikawa et al.

(10) Patent No.: US 8,253,806 B2
(45) Date of Patent: Aug. 28, 2012

(54) IMAGE SHARING SYSTEM, IMAGE MANAGING SERVER, AND CONTROL METHOD AND PROGRAM THEREOF

(75) Inventors: Takuma Mikawa, Kawasaki (JP); Yoko Uchida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 778 days.

(21) Appl. No.: 12/333,546

(22) Filed: Dec. 12, 2008

(65) Prior Publication Data

US 2009/0157696 A1 Jun. 18, 2009

(30) Foreign Application Priority Data

Dec. 17, 2007 (JP) ................................. 2007-325211
Dec. 8, 2008 (JP) ................................. 2008-312493

(51) Int. Cl.
*H04N 5/225* (2006.01)
*H04N 7/173* (2011.01)
(52) U.S. Cl. ................... 348/207.1; 725/105; 348/231.2
(58) Field of Classification Search ................... 348/231, 348/207.1, 211, 231.2, 231.3, 231.5, 231.9, 348/211.14, 211.5, 211.3, 211.99; 725/105; 709/203, 208, 212, 213, 217
See application file for complete search history.

(56) References Cited

U.S. PATENT DOCUMENTS

| 6,035,323 | A  | * | 3/2000 | Narayen et al. | ............... | 709/201 |
| 7,284,040 | B2 | * | 10/2007 | Kobayashi et al. | ........... | 709/219 |
| 7,639,943 | B1 | * | 12/2009 | Kalajan | ......................... | 396/429 |
| 7,644,431 | B2 | * | 1/2010 | Creamer et al. | ............... | 725/105 |
| 2008/0060013 | A1 | * | 3/2008 | Sarukkai et al. | ................ | 725/46 |
| 2008/0086511 | A1 | * | 4/2008 | Takao et al. | ................ | 707/104.1 |
| 2009/0180005 | A1 | * | 7/2009 | Takahashi | .................. | 348/231.2 |
| 2009/0231441 | A1 | * | 9/2009 | Walker et al. | ............... | 348/207.1 |
| 2010/0091136 | A1 | * | 4/2010 | Nakase et al. | ............. | 348/231.2 |
| 2011/0043658 | A1 | * | 2/2011 | Sasai | .......................... | 348/231.3 |
| 2011/0096194 | A1 | * | 4/2011 | Obata et al. | ................ | 348/231.2 |

FOREIGN PATENT DOCUMENTS

| JP | 2004-222056 | 8/2004 |
| JP | 2005-243018 | 9/2005 |
| JP | 2006-244430 | 9/2006 |

* cited by examiner

*Primary Examiner* — Aung S Moe
(74) *Attorney, Agent, or Firm* — Cowan, Liebowitz & Latman, P.C.

(57) ABSTRACT

An image processing apparatus determines categories for classifying image data based on shooting information of the image data, generates an update information file for each category, and uploads the update information file along with the image data to an image managing server. A client terminal registers, in advance, the address of a desired update information file, and periodically checks the update information file in the image managing server. If the update information file indicates that new image data has been added to the image managing server, the image data is downloaded in accordance with the file path described in the update information file.

14 Claims, 10 Drawing Sheets

FIG. 6

```
<?xml version="1.0" encoding="utf-8"?>
<rdf : RDF xmlns="http://purl.org/rss/1.0/" xml : lang=" ja">
  <channel>
    <pubDate>Tue, 29 Aug 2006 22:01:01 GMT</pubDate>         ⎫
    <title>Photo RSS 「hanako」</title>                        ⎪
    <link>http://w5.image.server/user/~hanako/travel.rdf</link>⎬ 600
    <description>UPDATE INFORMATION 「hanako」</description>    ⎭
  </channel>
  <item rdf : about="http://w5.image.server/user/~hanako/200608/">  ⎫
    <title>C_0001. jpg</title>                                      ⎪
    <guid>http://w5.image.server/user/~hanako/200608/C_0001. jpg</guid>⎬ 601
    <link>http://w5.image.server/user/~hanako/200608/C_0001. jpg</link>⎪
    <puData>2006-08-28T17:23:05+09:00</dc:date>                      ⎭
  </item>
  <item rdf : about="http://w5.image.server/user/~hanako/200608/">  ⎫
    <title>D_0001. jpg</title>                                      ⎪
    <guid>http://w5.image.server/user/~hanako/200608/D_0001. jpg</guid>⎬ 602
    <link>http://w5.image.server/user/~hanako/200608/D_0001. jpg</link>⎪
    <puData>2006-08-29T13:32:15+09:00</dc:date>                      ⎭
  </item>
  <item rdf : about="http://w5.image.server/user/~hanako/200608/">  ⎫
    <title>F_0001.avi</title>                                       ⎬ 603
    <link>http://w5.image.server/user/~hanako/200608/F_0001.avi</link>⎪
    <puData>2006-08-29T08:05:06+09:00</dc:date>                      ⎭
  </item>
</rdf : RDF>
```

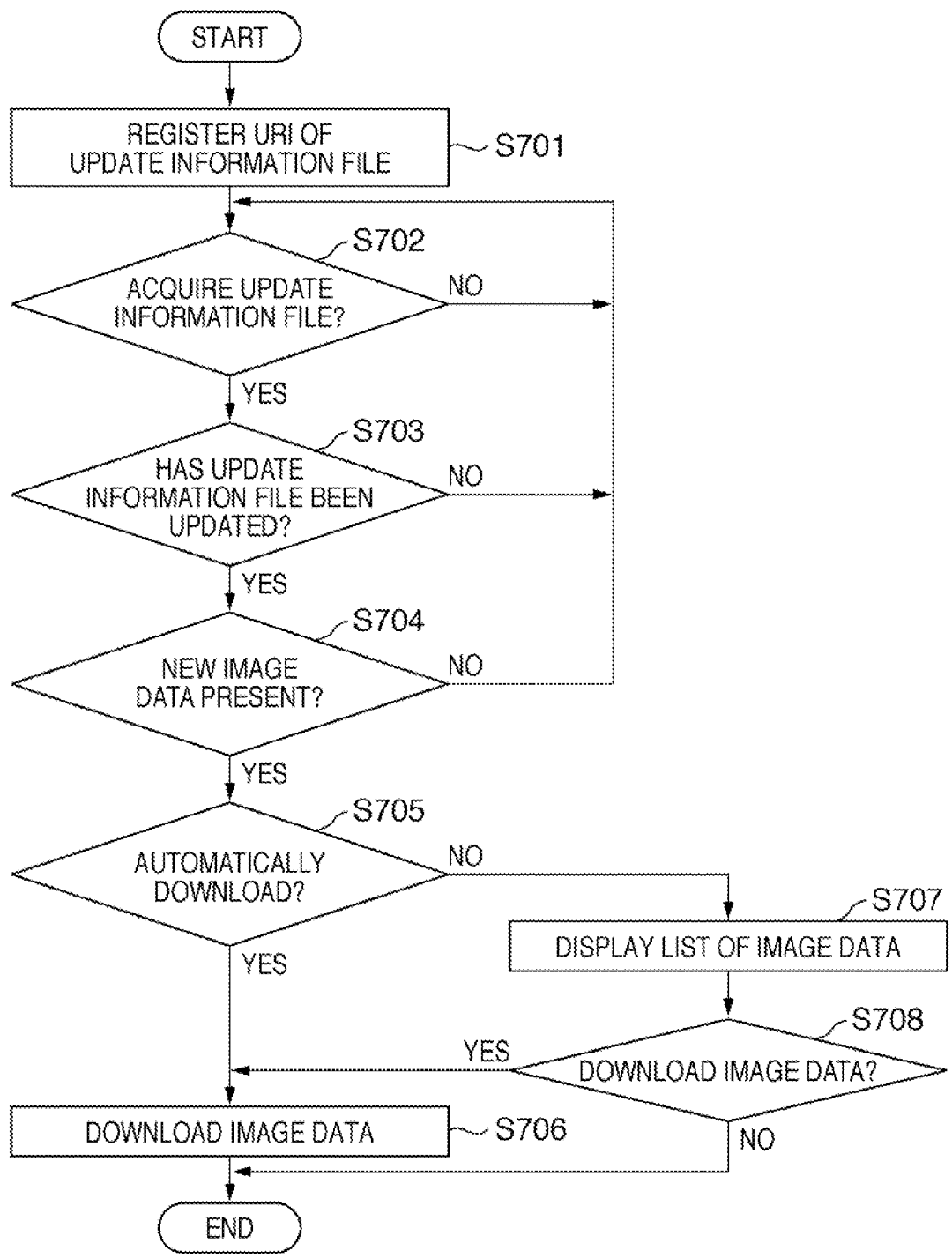

IMAGE SHARING SYSTEM, IMAGE MANAGING SERVER, AND CONTROL METHOD AND PROGRAM THEREOF

BACKGROUND OF THE INVENTION

1. Field of the Invention

The present invention relates to a technique whereby a communication device of a user in a remote location uses image data that has been uploaded to a server device on a network by a photographer's camera.

2. Description of the Related Art

With the recent spread of digital cameras, digital video cameras, and so on, digital still image data and video data is not only being stored in household personal computers (PCs), but is also being uploaded to server devices on networks and shared with other users. Furthermore, in addition to information processing apparatuses such as personal computers, cellular phones, digital cameras, and the like have recently started being connected to networks and sharing digital images. Because it has become common for many users to share large amounts of image data using a variety of devices, managing digital image data using various types of systems has been proposed.

However, when a communication device of a user in a remote location uses image data from a provider, the user does not know the status of updates with respect to his/her desired image data. Therefore, it is necessary to access the server device that stores the image data each time that image data is to be received, which is burdensome for the user. Furthermore, an increase in the types of necessary image data leads to an increase in the number of times the server device is accessed, which increases the burden on the user.

SUMMARY OF THE INVENTION

The present invention quickly and reliably informs a user that an image of a desired category has been uploaded to the communication device of a user in a remote location in the case where a photographer's camera has uploaded image data to a server device on a network and that image data is to be shared with the communication device of the user. The present invention also makes it possible to easily download images belonging to a desired category.

One aspect of the present invention provides an image sharing system comprising a camera, a server device and a client terminal, in which the camera uploads image data to the server device and the client terminal downloads the image data from the server device, on a network, wherein the camera comprising an extracting unit configured to extract shooting information of image data that is to be uploaded, a determining unit configured to determine categories of the image data in accordance with the shooting information, a generating unit configured to generate an update information file for each of the categories and a transmission unit configured to transmit the update information file and the image data to the server device, wherein the client terminal comprising an acquiring unit configured to automatically acquire the update information file from the server device, an identifying unit configured to identify image data to be downloaded from the server device and a downloading unit configured to download the image data identified by the identifying unit from the server device.

Another aspect of the present invention provides a camera that uploads image data to a server device via a network, the camera comprises an extracting unit configured to extract shooting information of image data that is to be uploaded, a determining unit configured to determine categories of the image data in accordance with the shooting information, a generating unit configured to generate an update information file for each of the categories, the update information file being automatically acquired by a client terminal from the server device and being used to identify image data downloaded to the client terminal and a transmission unit configured to transmit the update information file and the image data to the server device.

Still other aspect of the present invention provides a control method for controlling a camera that uploads image data to a server device via a network, the method comprises, extracting shooting information of image data that is to be uploaded, determining categories of the image data in accordance with the shooting information, generating an update information file for each of the categories, the update information file being automatically acquired by a client terminal from the server device and being used to identify image data downloaded to the client terminal and transmitting the update information file and the image data to the server device.

Further features of the present invention will be apparent from the following description of exemplary embodiments with reference to the attached drawings.

BRIEF DESCRIPTION OF THE DRAWINGS

FIG. 6 is a diagram illustrating an example of an update information file according to an embodiment of the present invention.

FIG. 7 is a flowchart illustrating an example of an operation by which a user's client terminal checks an update information file in an image managing server according to an embodiment of the present invention.

DESCRIPTION OF THE EMBODIMENTS

Preferred embodiments of the present invention will now be described with reference to attached drawings. It should be noted that the relative arrangement of the components, the numerical expressions and numerical values set forth in these embodiments do not limit the scope of the present invention unless it is specifically stated otherwise.

First Embodiment

Figure 1:
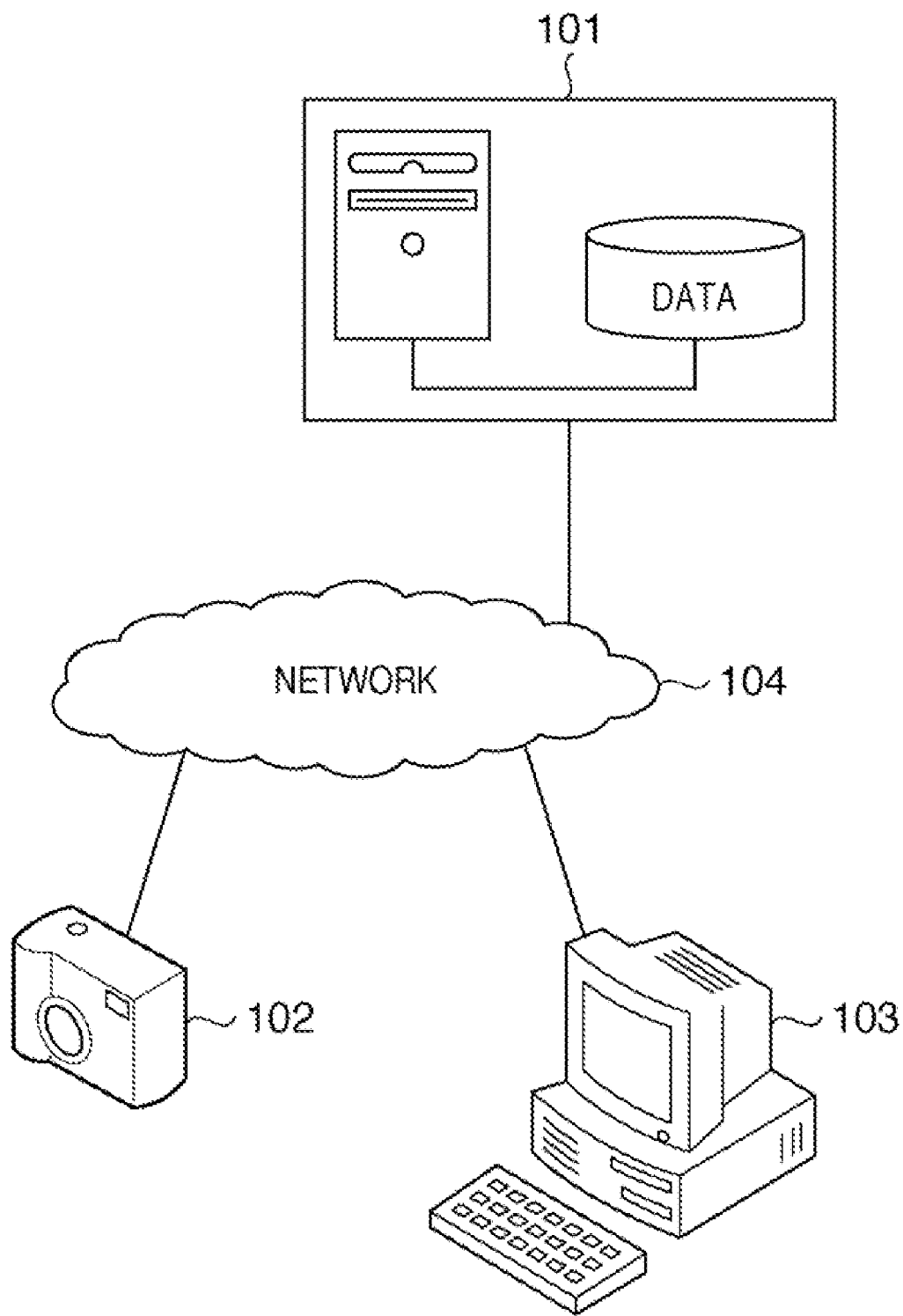
FIG. 1 is a block diagram illustrating an example of the configuration of an image managing system according to an embodiment of the present invention.

An image managing system according to the present embodiment shall be described with reference to the block diagram in FIG. 1. 102 is an image shooting apparatus, 103 is a user's client terminal (communication device), 101 is an image managing server, and 104 is a network. The image shooting apparatus 102 uploads image data to the image managing server 101, where the data is stored. In addition, the client terminal 103 accesses the image managing server 101 and downloads image data.

The configuration of the image shooting apparatus 102 according to the present embodiment shall be described next with reference to the block diagram in FIG. 2. The shooting apparatus 102 is, for example, a digital camera, digital video cameras, and so on.

Figure 2:
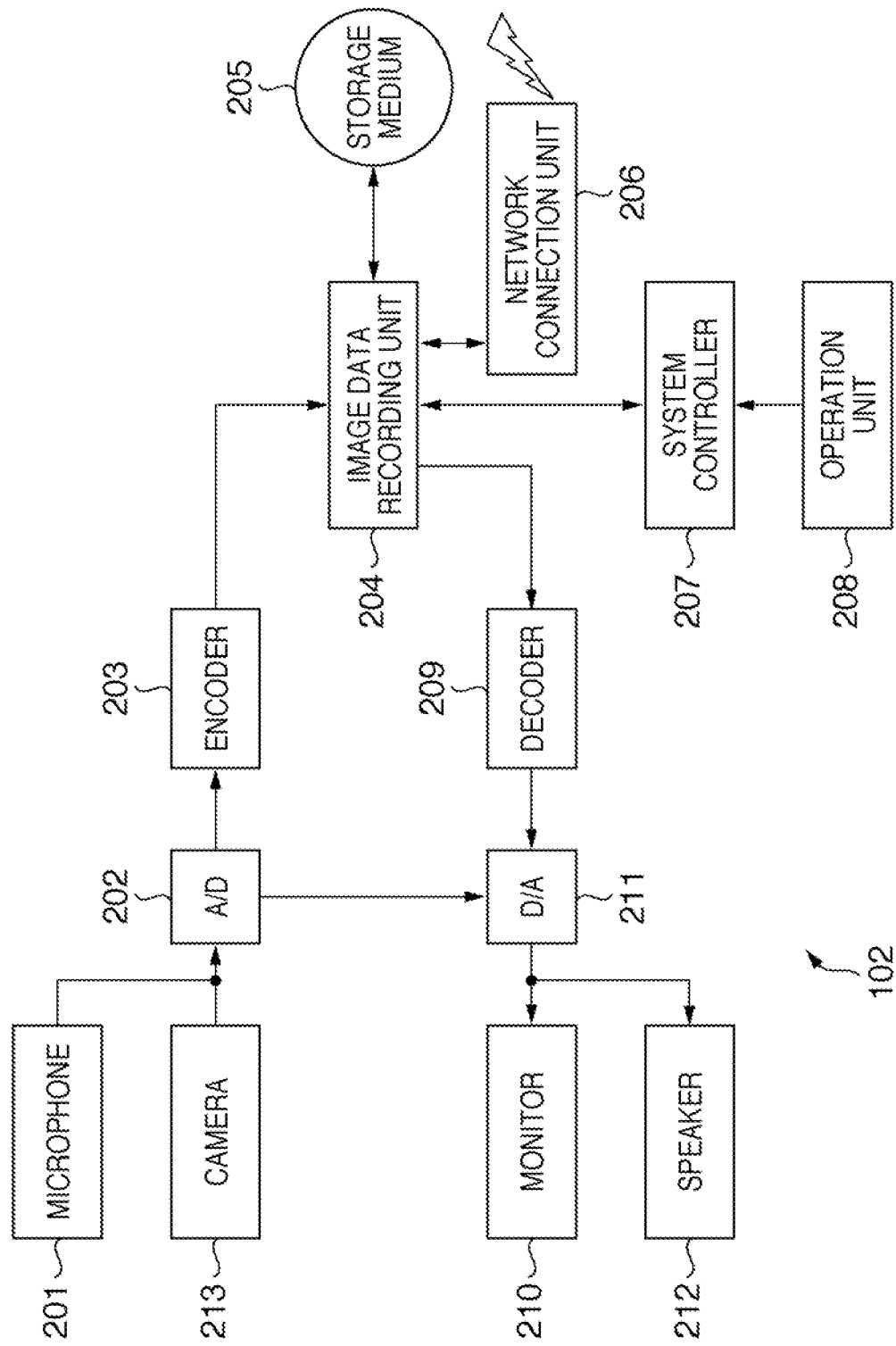
FIG. 2 is a block diagram illustrating an example of the configuration of an image shooting apparatus according to an embodiment of the present invention.

In FIG. 2, a camera unit 213 converts an optical image of an object into an electrical signal. A microphone 201 converts audio into an electrical signal. An A/D converter 202 is inputted with analog signals and converts those signals to digital signals. An encoder 203 compresses and encodes digital image data (using, for example, the JPEG format for still image data, the MJPEG format for moving image data, and so on). An image data recording unit 204 creates a file for the image data (an image file) and stores that file in a storage medium 205. The storage medium 205 is a randomly-accessible storage medium, in which digital data such as image data is stored in file format. A network interface unit 206 connects to an external device and uploads image files, multiple update information files, and so on to the external device. An operation unit 208 includes an operation panel, a remote control, and the like, and inputs various data, commands, and so on upon being operated by a user. A system controller 207 is a control unit that controls the overall operations of the image shooting apparatus, and includes a microcomputer. A decoder 209 decodes compressed and encoded digital data. A D/A converter 211 converts a digital signal into an analog signal. A monitor 210 is a display unit. A speaker 212 converts an electrical signal into an acoustic signal.

A control program necessary for implementing the various processes according to the present embodiment is stored in the system controller 207. However, the configuration may be such that the control program is stored in a memory card or the like, serving as the storage medium 205, and the control program is loaded from the storage medium 205 into the system controller 207 and then executed. Similarly, the present invention can also be applied in a case where the program is located on a network.

The image shooting apparatus 102 connects to the network 104 via the network interface unit 206. Meanwhile, server information, including an address for accessing the image managing server 101 to which image data is to be uploaded, is held in a ROM. The image shooting apparatus 102 thus accesses the image managing server 101 in accordance with the address included in the server information and uploads the image data it holds to the image managing server 101. Furthermore, the image shooting apparatus 102 can store shot image data as a file in an external storage device, such as a memory card, and can register multiple categories in the metadata for that image data. The categories are used when classifying the image data. The categories are, for example, keywords set arbitrarily by the user of the image shooting apparatus 102 through the operation unit, shooting information such as the shooting mode used when shooting the image data, the shooting date, the model name of the image shooting apparatus, the photographer, the shutter speed, the presence or absence of flash illumination, and so on. Alternatively, the categories may be keywords automatically set based on the shooting information; for example, a keyword of "people" may be automatically set as a category if the shooting mode is a portrait mode, a keyword of "summer" may be automatically set as a category if the shooting date is in August, and so on. Further still, the categories may be keywords automatically set based on the results of analyzing the image data; for example, the names of people identified through facial recognition performed on the image data may be automatically set as categories, the tones identified by analyzing the colors of the image data may be automatically set as categories, and so on. The category of the image data is determined in such a manner, based on attribute information of that image data. Meanwhile, the image shooting apparatus 102 has a function for extracting the metadata associated the image data, and can generate an update information file of the image data in accordance with the category of the extracted metadata. The metadata also includes the name of the image data, identification information for uniquely identifying the image data, and so on. Note that although the above descriptions discuss a case where the attribute information added to the image data is extracted, the attribute information of the image data may be stored in an external storage device independent of the image data, and attribute information associated with the image data may then be extracted from the external storage device.

In response to a button operation made by the user, the image shooting apparatus 102 commences a process for uploading image data to the image managing server 101. Although the image data handled in the present embodiment has been specified as JPEG data for still images and AVI Motion JPEG files for moving images, the present invention can be applied even if other image data formats are used.

Although the present embodiment shall describe a case in which the image shooting apparatus 102 shoots, records, and uploads image data, the uploading may be implemented by another image processing apparatus capable of connecting to the network. For example, the image data, update information files, and so on recorded onto a recording medium by the image shooting apparatus 102 may be imported by a personal computer (PC), a cellular phone, or the like, and then uploaded to the image managing server 101. Alternatively, the update information file may be generated by importing the image data alone from the image shooting apparatus 102 into a PC at this time, extracting the metadata from that image data, and determining the category in accordance therewith.

Next, the module configuration of a computer apparatus (information processing apparatus) for implementing the image managing server 101, a user's client terminal 103, and so on shall be described with reference to FIG. 3. A personal computer, cellular phone, or the like can be given as examples of an information processing apparatus for implementing the client terminal 103. Although the image managing server 101 shall be described as an example hereinafter, note that the same descriptions apply to the client terminal 103.

Figure 3:
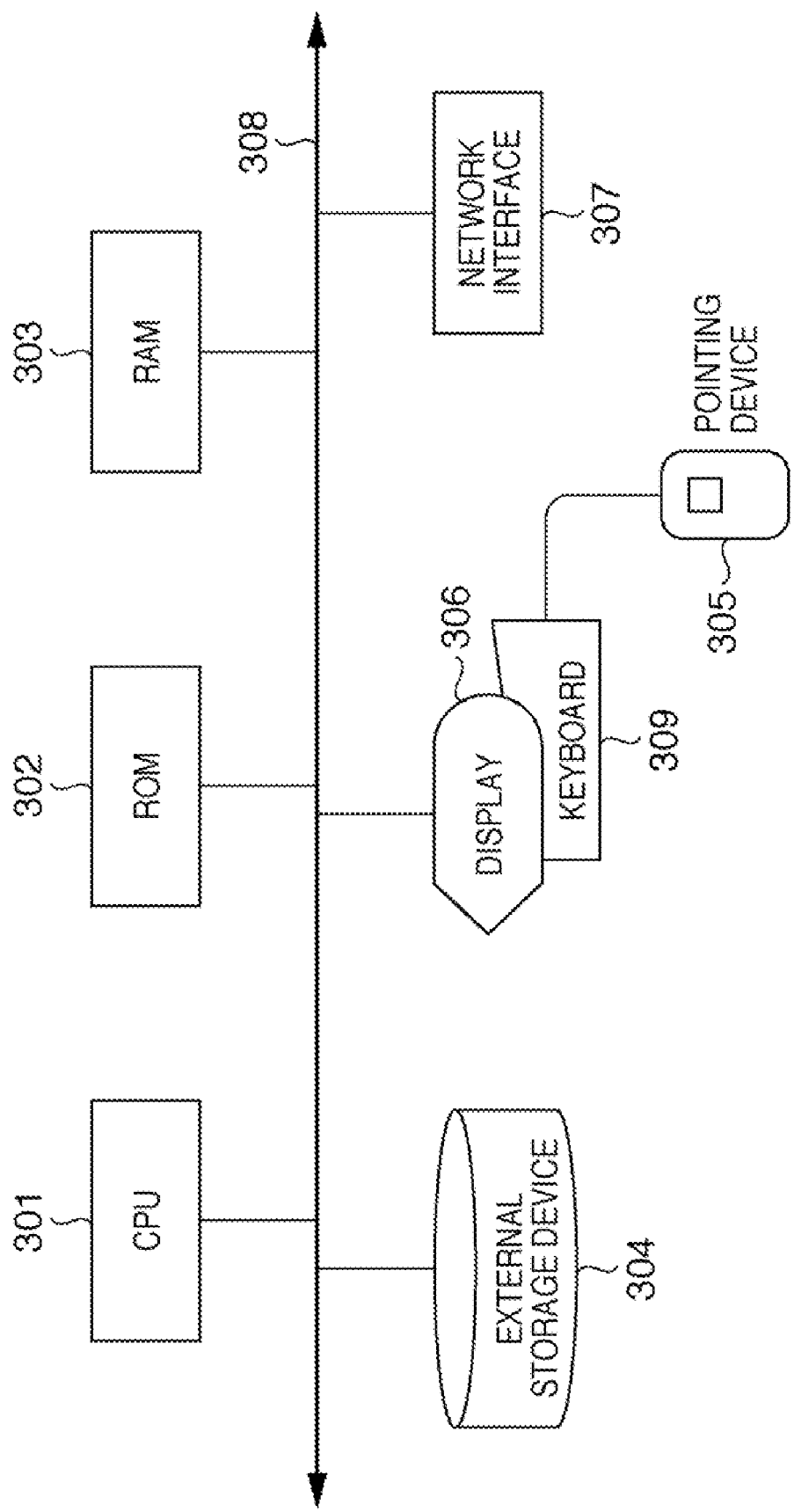
FIG. 3 is a block diagram illustrating an example of the configuration of a computer apparatus used to implement an image managing server, a user's client terminal, and so on according to an embodiment of the present invention.

In FIG. 3, 301 is a central processing unit (CPU) that controls the entirety of the image managing server 101. 302 is a read-only memory (ROM) that stores programs, parameters, and so on that do not require alterations. 303, meanwhile, is a random access memory (RAM) that temporarily stores programs, data, and so on supplied from an external device or the like. 304 is a hard disk, a memory card, or the like that is fixedly installed in a computer apparatus 300. Alternatively, 304 may be an external storage device that includes a Floppy® disk (FD), an optical disk such as a compact disk (CD) or the like, a magnetic or optical card, a smartcard, a memory card, and so on, which are removable from the computer apparatus 300. An operating system (OS), various application software programs, and so on are stored in the external storage device 304. 305 and 309 make up an interface for accepting user operations, where 305 is a pointing device or the like for inputting user operations, and 309 is an input device, such as a keyboard or the like. 306 is an interface for a monitor 310 that displays supplied data, data held in the computer apparatus 300, and so on. 307 is a network interface for connecting to a network line such as the Internet. Finally, 308 is a system bus that connects the various units 301 to 307 in a communicable state.

The image managing server 101 may read out programs stored in the hard disk 304 and cause the programs to be executed by the CPU 301, or may download programs from another web server device on the network and cause the programs to be executed by the CPU 301.

In addition, the image managing server 101 may have multiple functions, and may be configured from a single or multiple computer apparatuses.

Next, operations by which the image shooting apparatus 102 generates an update information file according to the present embodiment shall be described with reference to the flowchart in FIG. 4. The update information files created in the present embodiment are created per category item that has been assigned to the image data.

Figure 4:
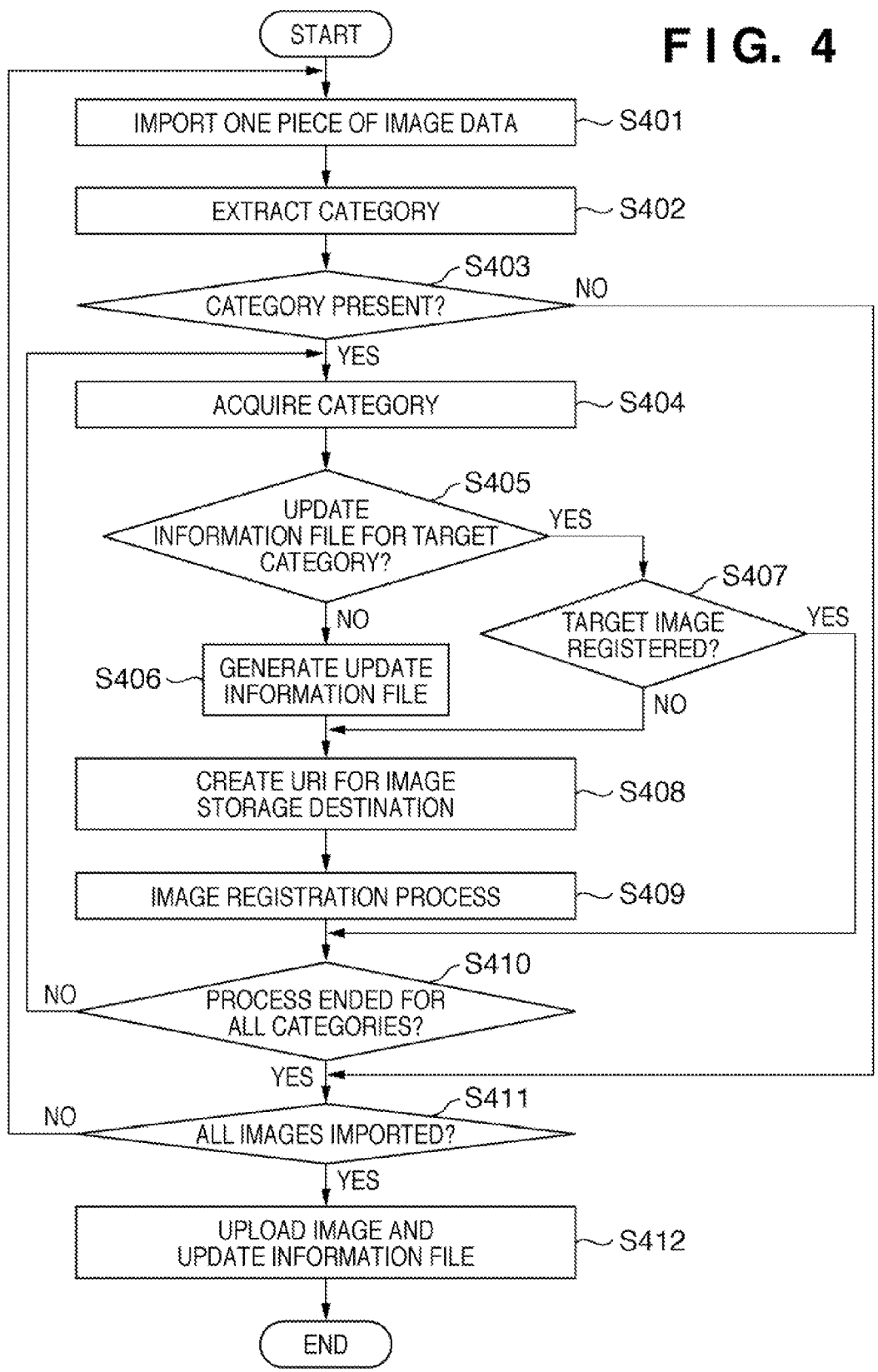
FIG. 4 is a flowchart illustrating an example of operations by which an image shooting apparatus creates an update information file according to an embodiment of the present invention.

The image shooting apparatus 102 waits for an upload instruction made by the user via an upload button on the operation unit 208, and commences the operations shown in the flowchart in FIG. 4 in response to the upload button being pressed. In the present embodiment, the processing is commenced at the same timing as the upload button being pressed. However, the invention is not limited thereto, and the timing at which the processing is commenced may be when a certain number of pieces of image data have been shot, when the image data has reached a certain size, every set amount of time, or the like.

First, in Step S401, the image shooting apparatus 102 imports one image's worth of image data from the storage medium 205 via the image data recording unit 204. Then, the procedure advances to Step S402, where the image shooting apparatus 102 reads the metadata of the image data imported in Step S401 and extracts the set category. Next, advancing to Step S403, it is determined whether or not a category is set for that image data. In the case where no category is present, the procedure moves to Step S411 without performing a process for registering information in the update information file.

In the case where a category is present in Step S403, the procedure moves to Step S404, where the image shooting apparatus 102 selects one of the categories extracted in Step S402 and imports that category as a target category. The procedure then moves to Step S405, where the image shooting apparatus 102 determines whether or not an update information file corresponding to the target category acquired in Step S404 is already present in the image data recording unit 204. In the case where an update information file for the target category is present, the procedure moves to Step S407. However, in the case where the update information file is not present, the procedure moves to Step S406, where the image shooting apparatus 102 creates a new update information file for that category.

The present embodiment assumes that one or more types of categories have been added to each piece of image data.

Next, in Step S406, the image shooting apparatus 102 creates an update information file corresponding to the target category acquired in Step S404, after which the procedure advances to Step S408. Here, address information (a URI) used when accessing the update information file is generated in accordance with a rule acquired in advance from the image managing server 101, and that address information is described in the update information file. For example, the URI is generated from a scheme name of "http", a server name of "w5", a domain name of "image.server", and information indicating the target category. The client terminal 103 can obtain the update status of the image data for each corresponding category by accessing the image managing server 101 using such a URI. Meanwhile, in Step S407, the image shooting apparatus 102 determines whether or not image data is registered in the update information file obtained in Step S405. In the case where image data is registered, the procedure advances to Step S410 without the image shooting apparatus 102 performing the processes in Steps S408 and S409 for registering information in the update information file. However, in the case where image data is not registered, the procedure advances the Step S408.

In Step S408, a URI that is to serve as the link destination for the image data in the image managing server 101 is created. Here, the image shooting apparatus 102 acquires a domain name, a subdomain name, naming rules, and so on in advance from the image managing server 101. The acquired information is information necessary for creating the address information (URI) for accessing the image data that has been uploaded to the image managing server 101. For example, a rule is defined so that a file path is created with a hierarchy starting with the scheme name of "http" and continuing with the server name of "w5", the domain name of "image.server", the user ID of the image shooting apparatus 102, the category, and the identification information of the image data. In such a case, the created URI is "http://w5.image.server/user0123/~portrait/img547.jpg". The user ID of the user of the image shooting apparatus 102 is assumed to have been registered in the image shooting apparatus 102 in advance. Furthermore, it is assumed that a file name has been issued and assigned to the image file obtained through shooting performed by the image shooting apparatus 102. The procedure then moves to Step S409, where the image shooting apparatus 102 sets the update date/time of the update information file to the current date/time, and registers the URI, created in Step S408, of the image data currently being processed, in the update information file of the target category.

The procedure then moves to Step S410, where the image shooting apparatus 102 determines whether the processing has ended for all categories added to that image data. If the processing has not ended, the procedure returns to Step S404, where the next target category is acquired and the aforementioned processing is once again executed. When, however, the image shooting apparatus 102 has determined in Step S410 that the processing has ended for all categories assigned to that image data, the procedure advances to Step S411, where it is determined whether the processing has ended for all the pieces of image data stored in the storage medium 205. If it has been determined that the processing has not ended for all the pieces of image data, the procedure returns to Step S401, where the image shooting apparatus 102 once again executes the aforementioned processing. If, however, it has been determined that the processing has ended for all the pieces of image data, the procedure advances to Step S412. In Step S412, the image shooting apparatus 102 uploads the image data as well as the image file that includes the metadata and the update information file to the image managing server 101. The image managing server 101 then stores the uploaded image file and update information file in the external storage device 304. After this, the image managing server 101 reads out the image file that has the URI provided by the client terminal 103, the update information file, and so on from the external storage device 304, and provides these files to the client terminal 103. The image shooting apparatus 102 may refer to the update date/time in the update information file and selectively upload a newly-created update information file or an update information file in which is registered the URI of new image data to the image managing server 101. Also, image data that has been determined to have already been registered in an update information file in Step S405 may be excluded from being uploaded to the image managing server 101. Finally, the image file and the update information file may be uploaded to different image managing servers 101.

Although the above describes the image shooting apparatus 102 newly creating or updating update information files for all categories that have been assigned to image data, the present invention is not limited thereto, and this process may be performed only for categories that the user of the image shooting apparatus 102 has selected. First, the image shooting apparatus 102 extracts all categories associated with the image data. The image shooting apparatus 102 then displays a list of the extracted categories in the monitor 210 and stands by for user input. Then, upon receiving user input via the operation unit 208, the image shooting apparatus 102 determines the categories for which update information files are to be created. Update information files are then created for the image data in the determined categories.

Through the above processing, the image shooting apparatus 102 uploads image data stored in the storage medium 205 and update information files for that image data to the image managing server 101.

The above describes a case where the image shooting apparatus 102 generates the update information files, the URIs for each piece of image data, and so on, and describes the URI in the update information file. However, the image shooting apparatus 102 may upload the data to the image managing server 101 without describing these URIs in the update information files, and the image managing server 101 may then issue the various URIs and add them to the update information files.

Figure 5:
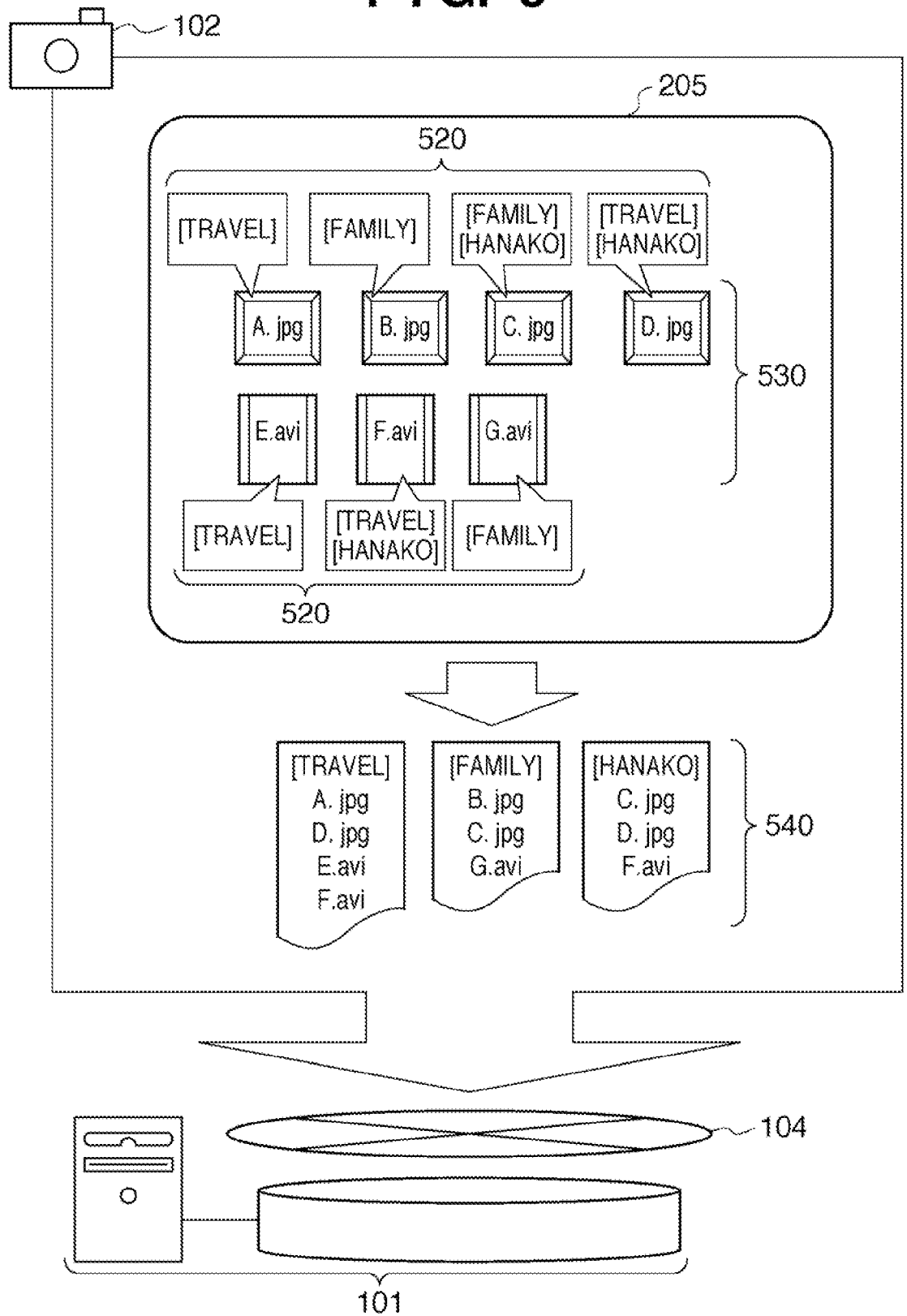
FIG. 5 is a block diagram illustrating an example of operations by which an image shooting apparatus creates an update information file and uploads the file to an image managing server system according to an embodiment of the present invention.

FIG. 5 is a block diagram illustrating an example of an image file and an update information file uploaded from the image shooting apparatus 102 to the image managing server 101 according to the present embodiment.

In FIG. 5, multiple pieces of image data 530, which include files in a still image format (the JPEG format), a video format (the AVI (Audio Visual Interleaved) format), and so on, are stored in the storage medium 205 of the image shooting apparatus 102.

Although the image data handled in the present embodiment has been specified as JPEG data for still images and AVI Motion JPEG files for moving images, the present invention can be applied even if other image data formats are used.

Categories 520 are set for each piece of image data 530. In the example shown in FIG. 5, the categories 520 include three items: "travel", "family", and "Hanako". Furthermore, a setting of "no category" is also possible. Update information files 540 are created for each category.

In the example shown in FIG. 5, a single update information file 540 is created for each of the three categories, or "travel", "family", and "Hanako". Accordingly, in this case, the total number of update information files 540 is "3". Here, in accordance with the categories 520, image data is registered in each update information file 540; for example, image data (B.jpg, C.jpg, and G.avi) is registered in the update information file 540 for the category of "family". After generating these update information files 540, the image shooting apparatus 102 uploads the image data 530 stored in the storage medium 205 and the update information files 540 to the image managing server 101 via the network 104.

FIG. 6 is a diagram illustrating an example of an update information file created based on the RSS 1.0 version of the RSS format (RDF Site Summary), which uses XML as the base of its data format.

In FIG. 6, 600 indicates that this update information file is update information for the image data whose category is "Hanako" (written here as "hanako"). 601 is update information for the image file C.jpg shown in FIG. 5, 602 is update information for the image file D.jpg shown in FIG. 5, and 603 is update information for the video file F.avi shown in FIG. 5. Furthermore, a URI for each piece of image data and a URI for referring to the update information file itself are described in the update information of each image file.

Although the example indicated here is an example of descriptions made based on the RSS 1.0 format, the description format may be any version after RSS 1.0, and the description format is not particularly limited.

Next, an operation by which the client terminal 103 automatically checks the update status of the image data from the image shooting apparatus 102 that is registered in the image managing server 101 and downloads data shall be described with reference to the flowchart in FIG. 7. The following process is implemented by the CPU 301 of the client terminal 103 controlling various modules in accordance with an RSS reader program stored in the external storage device 304, an OS (operating system), and so on. Although the present embodiment uses an RSS reader program as an example in its descriptions, the program is not limited thereto, and any program may be used as long as that program has a function for checking the update information file at a predetermined timing.

In Step S701, the client terminal 103 registers the URI of the update information file. A user can be informed of the URI of the update information file through an email sent from the provider. Alternatively, the image managing server 101 or another web server device present on the network may manage the URIs of the update information files, and the URI of an update information file can then be acquired by the client terminal 103 accessing the server device. The URI selected by the user from among the URIs of the update information files notified in this manner is then registered. Through this, it is possible for the user to be automatically informed of the update status of image data in a desired category. Furthermore, by downloading image data for each predetermined category to the client terminal 103, the user can divide and hold image data from a provider.

In Step S702, the client terminal 103 first determines whether or not it is time to check the update information file. A time cycle at which to check the update information file is set in advance in the RSS reader program. In accordance with this cycle, the client terminal 103 polls the image managing server 101 every set amount of time using the URI registered in Step S701, and if an update information file is acquired, the update status of that update information file is checked in Step S703. The update date/time is described in the update information file, and the date/time of the previous check is recorded in the RSS reader program. Accordingly, the two are compared, and if the update date/time of the update information file is after the date/time of the previous check, the update information file is determined to have been updated.

If the update information file has been determined to have been updated in Step S703, the client terminal 103 then determines, in Step S704, whether or not descriptions regarding new image data have been added to the update information file. Identification information for each piece of image data is described in the update information file, and the client terminal 103 holds identification information of the image data stored in its own hard disk 304. Accordingly, the two are compared, and if there is image data that is described in the update information file but is not stored in the hard disk 304 of the client terminal 103, that image data is determined to have been newly added.

In the case where it has been determined, in Step S704, that there is newly-added image data, the client terminal 103 then determines, in Step S705, whether or not to automatically download the image data. The RSS reader program is set in advance by the user to either automatically download image data that has been added or manually download image data that has been added following instructions from the user. In the case where it has been determined, in Step S704, that there is no newly-added image data, the procedure returns to Step S702.

In the case where it has been determined, in Step S705, to automatically download the image data, the client terminal 103 then downloads, in Step S706, the newly-added image data from the image managing server 101 in accordance with the URI of that image data. The image data is then associated with the identification information and stored in the hard disk 304 of the client terminal 103. The image data downloaded in Step S705 is then stored in folders that are classified by category. The image data may furthermore be stored in subfolders in accordance with the date/time of the download.

Here, when it has been determined, in Step S703, that the update information file has been updated but it has also been determined, in Step S704, that there is no new image data, it can be assumed, for example, that the category of preexisting image data has changed. The embodiment has thus far described not performing the download process for image data in Step S705, regardless of category, in the case where there is already image data stored in the client terminal 103. However, at this time, the client terminal 103 may download not the image data, but information indicating the newly-set category of the image data, from the image managing server 101, and store preexisting image data in association therewith in a folder of a new category.

Figure 8:
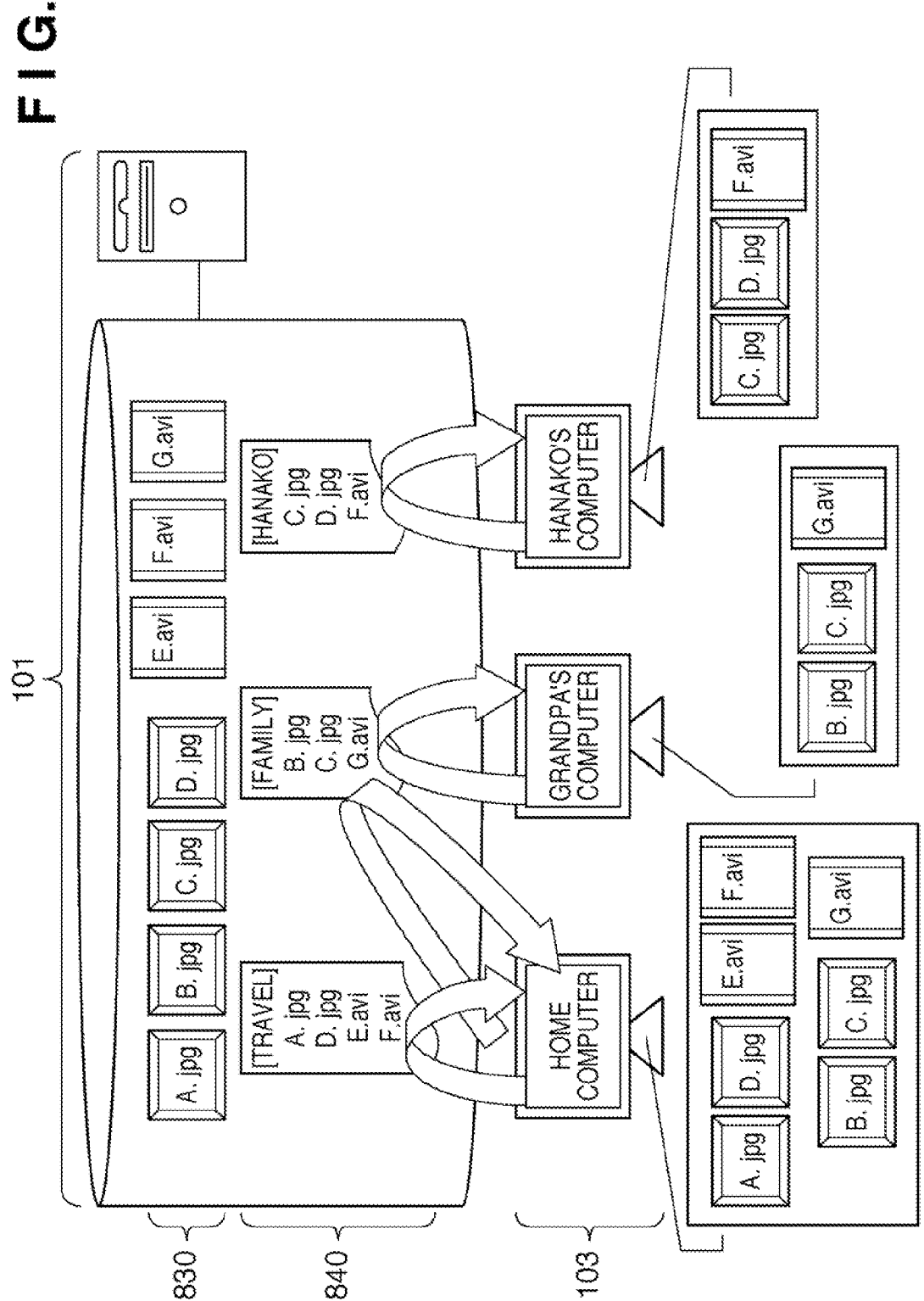
FIG. 8 is a block diagram illustrating an example of an operation by which a client terminal downloads image data according to an embodiment of the present invention.

In the example in FIG. 8, the client terminal 103 polls the update information files 840 in the categories "travel" and "family". When those update information files 840 are updated and indicate that new image data 830 has been added, that image data is downloaded and stored in the hard disk 304 of the client terminal 103. However, in the case where it has been determined, in Step S705, not to automatically download the image data, the client terminal 103 then creates, in Step S707, a list of the newly-added image data, and displays this list in the display unit.

In Step S708, the client terminal 103 determines whether or not to download the image data. A button for instructing whether or not to perform the download is also displayed in the screen displaying the image data list, and a selection of either option is inputted by the user via the input device 309. In the case where it has been determined, in Step S708, to download the image data, the client terminal 103 then downloads the image data and stores that image data in the hard disk 304 in Step S706.

In the case where the user has instructed the image data to be downloaded in Step S708, the user may be enabled to select which image data to download, and the selected image data may then be downloaded in Step S709.

According to the present embodiment as described thus far, image data shot by the image shooting apparatus 101 can be grouped by category and update information files can be created for each category. Accordingly, it is possible for a user to be informed as to the update status of image data, in terms of the category of the image data and the upload source of the image data.

Second Embodiment

Although the above first embodiment described a case where the image shooting apparatus 102 generates the update information file, the present second embodiment describes a case where the image managing server 101 generates the update information file. Hereinafter, details identical to those of the first embodiment shall be omitted, and the details unique to the second embodiment shall be described in detail.

Figure 9:
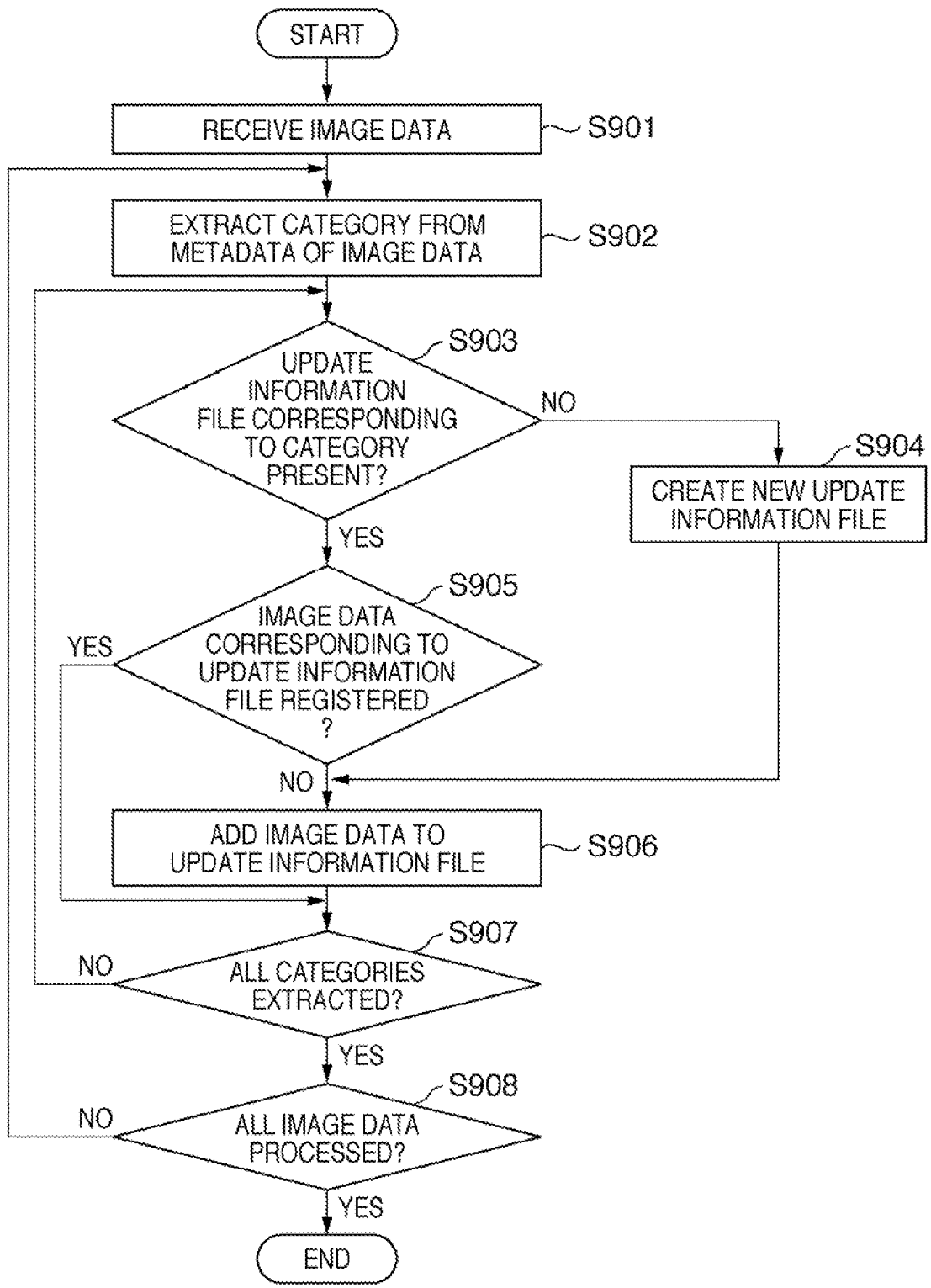
FIG. 9 is a flowchart illustrating an example of an operation by which an image managing server creates an update information file according to an embodiment of the present invention.

First, an operation by which the image managing server generates update information files per category for image data uploaded from the image shooting apparatus 102 according to the present embodiment shall be described with reference to the flowchart in FIG. 9. The image managing server according to the present embodiment holds an update information file creation program in the hard disk 304, and thus the following processing is implemented by the CPU 301 of the image managing server operating in accordance with an OS, the update information file creation program, and so on.

In Step S901, the image managing server 101 receives image data uploaded from the image shooting apparatus 102 via the network I/F 307, and stores that image data in the hard disk 304. Here, the image managing server 101 issues a URI for the uploaded image data in accordance with a predetermined rule. Then, in Step S902, the image managing server 101 extracts the metadata associated with that image data. In Step S903, the image managing server determines, by referring to the hard disk 304, whether or not an update information file of the extracted category already exists. If it is determined, in Step S903, that there is no update information file, the image managing server creates a new update information file in Step S904. Here, a URI, which is address information for accessing that update information file, is issued to the update information file, and is stored in association therewith in the hard disk 304. The procedure then advances to Step S906. However, if it is determined, in Step S903, that there is an update information file, the image managing server 101 determines, in Step S905, whether or not information regarding the image data received in Step S901 is described in the preexisting update information file. If it is determined, in Step S905, that information regarding the image data is not described in the update information file, the procedure advances to Step S906. In Step S906, the image managing server describes the information regarding the image data received in Step S901 in the update information file. After this, the image managing server 101 determines, in Step S907, whether the processing has been executed for all the categories of the image data, and determines, in Step S908, whether the processing has been executed for all the received image data, and if unprocessed items are still present, the above processing is repeated. The image managing server 101 notifies the image shooting apparatus 102, the client terminal 103, and so on of the URI of the update information file.

The client terminal 103 registers the URI of the update information file in the RSS reader program, and executes the same process as that illustrated in the flowchart in FIG. 7 and described in the first embodiment.

Figure 10:
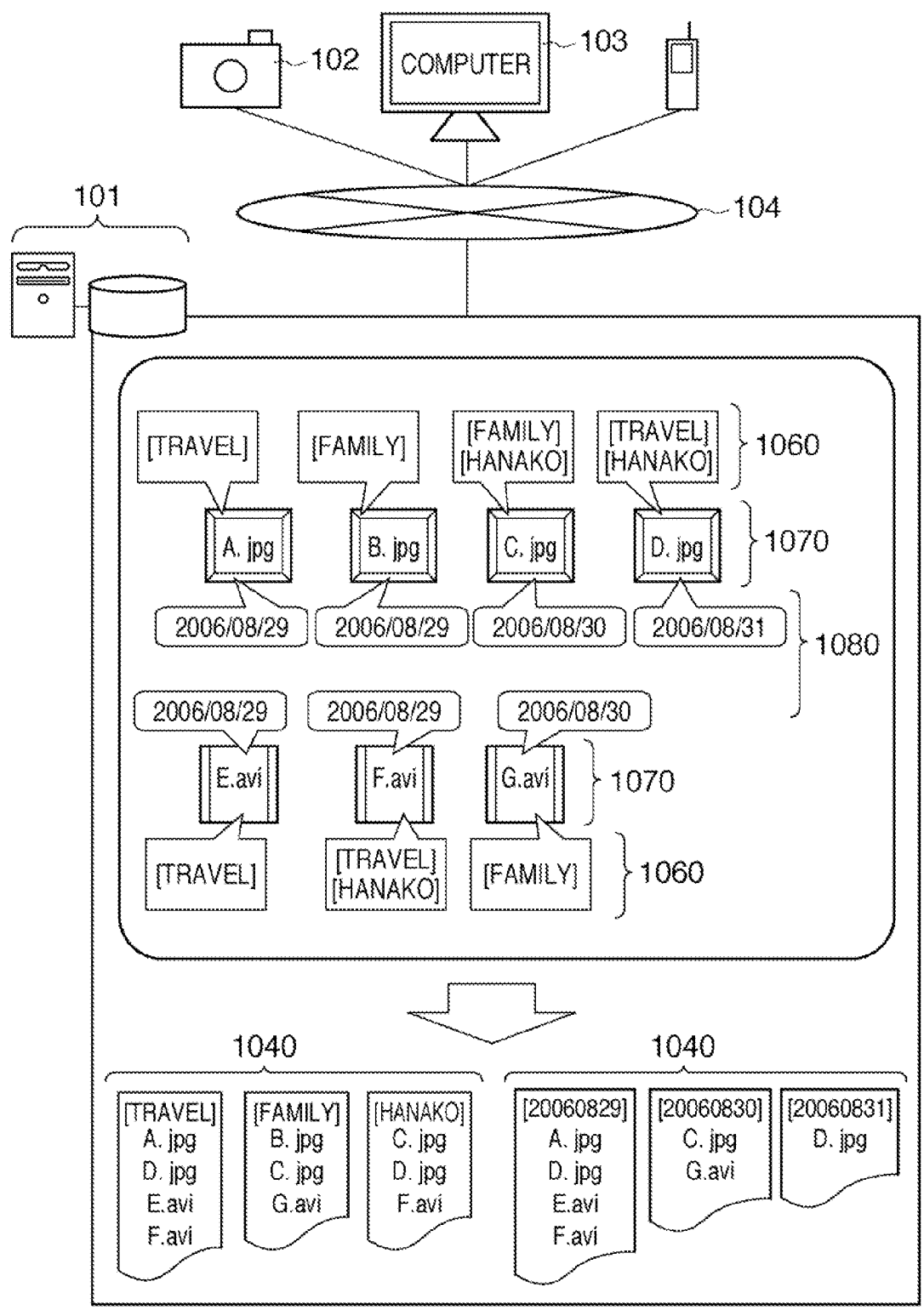
FIG. 10 is a block diagram illustrating an example of an operation by which an image managing server creates an update information file according to an embodiment of the present invention.

In the example shown in FIG. 10, the image managing server 101 creates and holds update information files 1040 for categories that include three items: "travel", "family", and "Hanako". However, it is also possible for the image managing server 101 to generate and hold an update information file 1040 with "no category".

The image managing server 101 then creates and holds an update information file 1040 for each shooting date. The update information files 1040 for each shooting date are created for each shooting date of the image data. In the example in FIG. 10, an update information file is created for each of the following shooting dates: "2006/08/29", "2006/08/30", and "2006/08/31". Thus, a total of three update information files are held. Therefore, in the example shown in FIG. 10, the total number of update information files is six, including files created per category and files created per shooting date.

According to the present embodiment as described thus far, the image managing server 101 can create update information files grouped by category for image data uploaded from multiple image shooting apparatuses 102. Accordingly, it is possible for a user to be informed as to the update status of image data, in terms of the category, regardless of the upload source of the image data.

It is furthermore possible for the user to download the image data category by category, regardless of the upload source.

Other Embodiments

The present invention can also be achieved by directly or remotely supplying a software program that realizes the functionality of the abovementioned embodiments to a system or device, whereupon a computer in the system or device reads out and executes the supplied program. In such a case, the format does not necessarily need to be a program, as long as it has the functionality of a program.

Accordingly, the program code itself, installed in a computer so as to realize the functional processing of the present invention through a computer, also realizes the present invention. In other words, the computer program itself, for realizing the functional processing of the present invention, is also included within the scope of the claims of the present invention. In this case, a program may be in any form, and object code, a program executed through an interpreter, script data supplied to an OS, or the like may be used, as long as it has the functionality of the program.

Various storage media can be used for supplying the program. A Floppy® disk, hard disk, optical disk, magneto-optical disk, MO, CD-ROM, CD-R, CD-RW, magnetic disk, non-volatile memory card, ROM, DVD (DVD-ROM, DVD-R), and so on can be given as an example of such a storage medium.

Alternatively, using a browser of a client computer to connect to an Internet homepage and downloading the computer program of the present invention to a storage medium such as a hard disk can be given as another method for supplying the program. In this case, the downloaded item may be the computer program of the present invention itself or a compressed file including a function for automatic installation. Furthermore, this method may be realized by dividing the program code that makes up the program of the present invention into a plurality of files and downloading each file from different homepages. In other words, a WWW server that allows a plurality of users to download the program files for realizing the functional processing of the present invention through a computer is also included within the scope of the claims of the present invention.

In addition, the program of the present invention may be encrypted, stored in a storage medium such as a CD-ROM or the like, and distributed to a user. In this case, a user that has cleared a predetermined condition is allowed to download key information for removing the cryptography from a homepage via the Internet, use the key information to decrypt the program into an executable format, and install the program on a computer.

In addition to a computer realizing the functionality of the aforementioned embodiments by executing a read-out program, the functionality of the embodiments may be realized through another form. For example, the functionality of the aforementioned embodiments can also be implemented by an OS or the like running on a computer executing part or all of the processing based on instructions in the program.

Furthermore, the program read out from the storage medium may be written into a memory provided in a function expansion board installed in the computer or a function expansion unit connected to the computer. In this case, after the program has been written into the function expansion board, function expansion unit, or the like, a CPU or the like provided in the function expansion board, function expansion unit, or the like executes part or all of the actual processing based on instructions of the program, and the functionality of the aforementioned embodiments can be realized through this processing.

According to the present invention, it is possible to quickly and reliably inform a user that an image of a desired category has been uploaded to the communication device of a user in a remote location in the case where a provider's image processing apparatus has uploaded image data to a server device on a network and that image data is to be shared with the communication device of the user. It is furthermore possible to easily download images belonging to a desired category.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-325211 filed on Dec. 17, 2007, and 2008-312493 filed on Dec. 8, 2008, which is hereby incorporated by reference herein in their entirety.

What is claimed is:

1. An image sharing system comprising a camera, a server device and a client terminal, in which the camera uploads image data to the server device and the client terminal downloads the image data from the server device, on a network:
   wherein the camera comprising:
      an extracting unit configured to extract shooting information of image data that is to be uploaded;
      a determining unit configured to determine one or more categories of the image data in accordance with the extracted shooting information;
      an adding unit configured to add identification information related to the image data to respective update information files corresponding to the determined one or more categories of the image data; and
      a transmission unit configured to transmit the update information files and the image data to the server device,
   wherein the client terminal comprising:
      a selecting unit configured to select at least one of the one or more categories corresponding to the update information files;
      an acquiring unit configured to automatically acquire the update information file(s) corresponding to the selected at least one of the one or more categories from the server device; and
      a downloading unit configured to download the image data, which is related to the identification information that is added to the acquired update information file(s), from the server device.

2. The image sharing system according to claim 1, the camera further comprising:
- a generating unit configured to generate a new update information file when no update information file corresponding to a determined category of the image data has not already been generated; and
- an updating unit configured to update a predetermined date when the generating unit generates a new update information file or the adding unit adds the identification information to an existing update information file,
- wherein said acquiring unit acquires the update information file(s) automatically based on the predetermined date.

3. The image sharing system according to claim 1,
- wherein the determining unit can determine a plurality of categories for a single piece of image data, and
- wherein the identification information related to the single piece of image data is described in the update information files for each of the categories.

4. The image sharing system according to claim 1, wherein the determined one or more categories includes at least one of a keyword, the shooting mode, the shooting date, the type of imaging apparatus, the photographer, the shutter speed, and the presence/absence of flash illumination.

5. The image sharing system according to claim 1, wherein the determining unit determines a shooting date of image data or a keyword corresponding to the shooting mode of the image data as the one or more categories.

6. The image sharing system according to claim 1, wherein the determining unit determines a category based on a result of an analysis of the image data.

7. A camera that uploads image data to a server device via a network, the camera comprising:
- an extracting unit configured to extract shooting information of image data that is to be uploaded;
- a determining unit configured to determine one or more categories of the image data in accordance with the extracted shooting information;
- an adding unit configured to add identification information related to the image data to respective update information files corresponding to the determined one or more categories of the image data, the update information files being automatically acquired by a client terminal from the server device and being used to identify image data to be downloaded to the client terminal; and
- a transmission unit configured to transmit the update information files and the image data to the server device.

8. The camera according to claim 7, further comprising:
- a generating unit configured to generate a new update information file when no update information file corresponding to a determined category of the image data has not already been generated; and
- an updating unit configured to update a predetermined date when the generating unit generates a new update information file or the adding unit adds the identification information to an existing update information file,
- wherein said acquiring unit acquires the update information file(s) automatically based on the predetermined date.

9. The camera according to claim 7,
- wherein the determining unit can determine a plurality of categories for a single piece of image data, and
- wherein the identification information related to the single piece of image data is described in the update information files for each of the categories.

10. The camera according to claim 7, wherein the determined one or more categories includes at least one of a keyword, the shooting mode, the shooting date, the type of imaging apparatus, the photographer, the shutter speed, and the presence/absence of flash illumination.

11. The camera according to claim 7, wherein the determining unit determines a shooting date of image data or a keyword corresponding to the shooting mode of the image data as the one or more categories.

12. The camera according to claim 7, wherein the determining unit determines a category based on a result of an analysis of the image data.

13. A control method for controlling a camera that uploads image data to a server device via a network, the method comprising the steps of:
- extracting shooting information of image data that is to be uploaded;
- determining one or more categories of the image data in accordance with the extracted shooting information;
- adding identification information related to the image data to respective update information files corresponding to the determined one or more categories of the image data, the update information files being automatically acquired by a client terminal from the server device and being used to identify image data to be downloaded to the client terminal; and
- transmitting the update information file and the image data to the server device.

14. A non-transitory computer-readable storage medium storing a computer program that causes a computer serving as a camera that uploads image data to a server device via a network to:
- extract shooting information of image data that is to be uploaded;
- determine one or more categories of the image data in accordance with the extracted shooting information;
- add identification information related to the image data to respective update information files corresponding to the determined one or more categories of the image data, the update information files being automatically acquired by a client terminal from the server device and being used to identify image data to be downloaded to the client terminal; and
- transmit the update information files and the image data to the server device.

* * * * *